Figure 1:
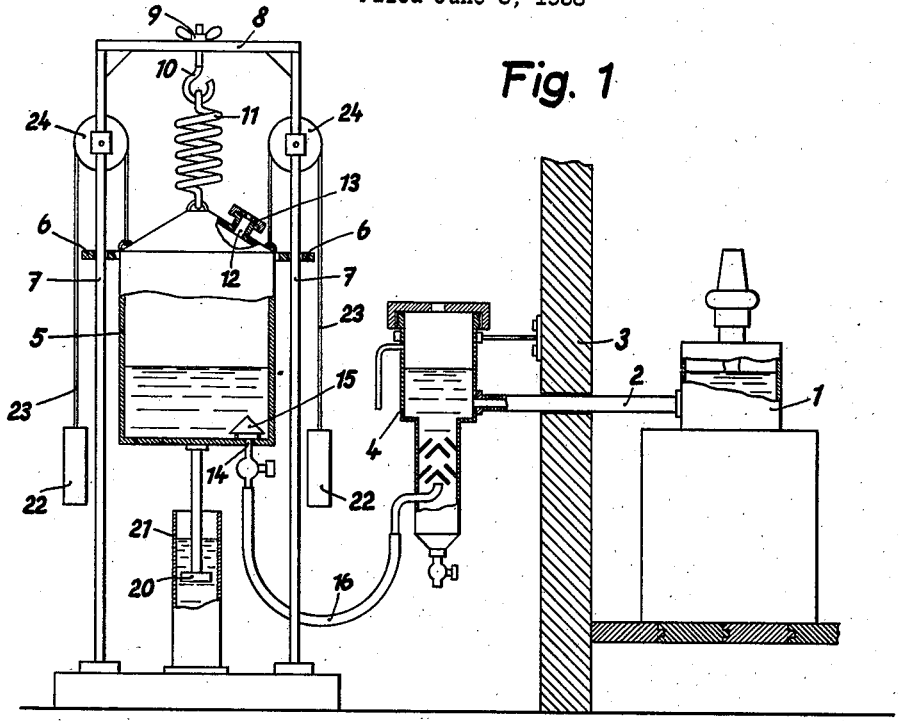

April 28, 1942.  V. T. JULIN  2,281,444

FLOW REGULATOR

Filed June 3, 1938

Inventor. V. T. Julin,
by Foster Cadieu
Attorneys.

Patented Apr. 28, 1942

2,281,444

UNITED STATES PATENT OFFICE 2,281,444

FLOW REGULATOR

Victor Teodor Julin, Djursholm-Danderyd, Sweden

Application June 3, 1938, Serial No. 211,695
In Sweden June 5, 1936

1 Claim. (Cl. 137—68)

This invention relates to a flow regulator, and in particular to a device for regulating the supply of liquid to an apparatus or container from a supply vessel which is arranged at the same level as or at a higher level than the apparatus, in such a manner that the level of the liquid in the apparatus or container remains constant. Known devices of this description are generally provided with automatically acting valves which regulate the flow of liquid so that the supply thereof remains constant irrespective of the actual level of the liquid in the supply vessel. However, valves have the disadvantage that they easily become clogged so that the reliability of operation of the device is impaired thereby. Moreover, trouble may also be caused by the automatic valve controlling mechanism.

An object of this invention is to provide an automatic flow regulator that is reliable in operation and has no mechanically acting control means for the liquid supply.

Other objects of the invention will appear as the description proceeds.

According to the invention, a vertically movable supply vessel is supported by means, such as springs, compressed air, or gas, controlled piston, or the buoyancy of liquid, which means are adapted automatically to alter the vertical position of the supply vessel, i. e., to raise or lower the same, in proportion to the alteration (increase or decrease) of the amount of liquid in the supply vessel, so that the absolute level of the liquid in the vessel remains constant during use, irrespective of the amount of liquid contained therein. The supporting means are preferably adjustable vertically so as to allow of regulating the pressure under which the liquid flows out of the supply vessel into the apparatus or container in which it is consumed.

The present invention is applicable in particular to stoves or furnaces and burners with liquid fuel supply. Hitherto furnaces with open burners have been provided with flat supply vessels which are disadvantageous since they must be of considerable size and therefore occupy a relatively large space. On the other hand, known gasifying burners have been provided with pressure regulators of different types adapted to regulate the level of the fuel in the burner casing. A supply vessel supported by springs or the like according to the invention may be made in any desired size, and enables mechanically actuated regulators to be dispensed with. The means for supporting the supply vessel may be combined with a thermostat adapted to make the flow regulator according to the invention independent of climatic influences.

On account of its great simplicity the device according to the invention may also be used in connection with apparatus hitherto built without supply vessels for reasons of reducing first cost.

The invention may be applied for instance also to liquid filled gas meters. In such gas meters the liquid level must be kept constant if the gas meter is to work accurately. However, the liquid level sinks owing to loss of liquid by evaporation, and therefore the gas meter has to be refilled at relatively short intervals of time. If the liquid container of a gas meter of this type be connected to a supply vessel supported by springs or the like according to the invention, refilling of the gas meter for compensation of losses of liquid due to evaporation has to be effected only after very long intervals of time.

The invention is further applicable to receptacles containing liquid into which articles, implements or the like are dipped, e. g., paint wells for paint brushes or ink vessels for pens. If such containers or vessels are coupled with a spring-supported supply vessel, the liquid level therein and thus the depth to which the brush or pen is immersed can be made constant.

Constructional examples of the device according to this invention are shown in the accompanying drawing in which—

Figure 3:
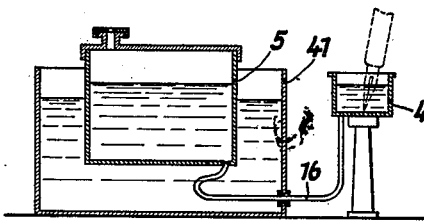
Figures 2, 4:
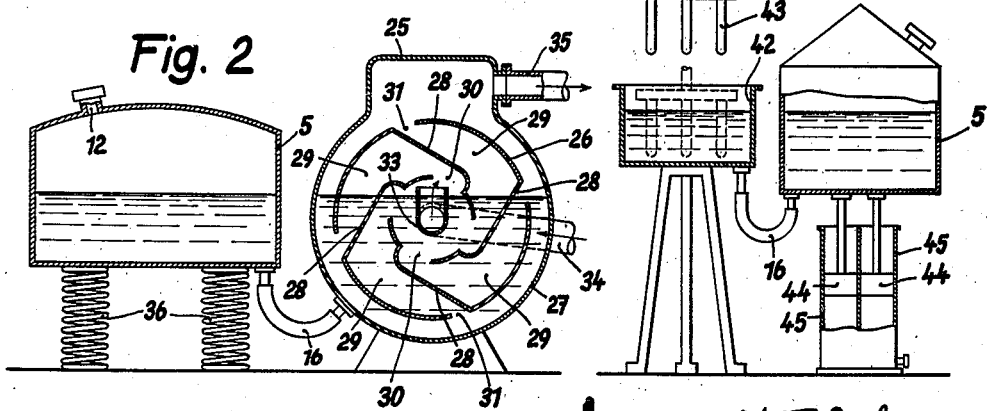

Fig. 1 is a vertical section of a flow regulator connected to a burner or furnace, Fig. 2 a vertical section of a modification of the device according to the invention in conjunction with a gas meter, Fig. 3 a vertical section of another modified form of construction in combination with an ink or paint well, and Fig. 4 a still further modification of the invention as combined with an apparatus for the production of goods produced by dipping.

Like reference characters denote like parts in the several figures of the drawing.

Referring to Fig. 1 an oil burner 1 of known construction is connected through a pipe 2 which passes through the wall 3 of a house to a purifier 4 and thence to a cylindrical supply vessel 5 located outside the house in the open air. The supply vessel is provided with lugs 6 that are guided vertically along uprights 7 connected by a cross bar 8. To the cross bar there is secured a vertically adjustable hook 10 screwed into a screw threaded bore of the cross bar and held fast by means of a wing nut 9. On the hook 10 is suspended a spring 11 carrying the supply vessel 5. The replenishing opening 12 of the vessel is covered by a perforated cap 13 and above the discharge opening 14 of the vessel there is disposed a hood 15 which serves to prevent oscillations of the liquid in the vessel 5 which may be caused on re-filling from being transmitted to the burner 1. The outlet opening 14 in the supply vessel is connected to the purifier 4 by means of a flexible tube or hose 16. The supply vessel 5 is provided with a damping device of a known type consisting of a piston 20 working in an oil-filled cylinder 21 in order to damp vertical oscillations of the supply vessel that may be set up on the filling of the same. The surfaces of the fuel in the vessel 5, the purifier 4 and the burner 1 are acted upon by the same pressure preferably by atmospheric pressure.

The spring on which the supply vessel 5 is suspended is so dimensioned that its elastic force is proportional to the weight of the liquid in the supply vessel, in such a manner that the spring raises or lowers the vessel if the amount of liquid contained therein decreases or increases, whereby the absolute level of the liquid in the vessel 5 remains constant irrespective of the amount of the liquid in the vessel. Of course, if it is desired not to keep the absolute level constant, this may be achieved by appropriately dimensioning the spring or shaping the vessel 5 accordingly, e. g., not cylindrically but in the form of a cone, so that the absolute liquid level is raised or lowered if the amount of liquid in the vessel decreases or increases.

Furthermore, the weight of the vessel 5 may be balanced by suitable means which consist, according to Fig. 1, of balance weights 22 secured to the vessel 5 by cords 23 running over rolls 24 journalled in the uprights 7.

From the foregoing description the method of operation will be clear without any further explanation. As long as fuel, e. g., oil, is present in the vessel, the burner 1 or the like will receive a constant supply so that the level of the fuel in the casing of the burner 1 is kept constant. Owing to the large capacity of the vessel 5 relatively to that of the burner casing, the filling of the vessel 5 need be effected only after a long space of time. On account of the simplicity of the device no further attention is required, while at the same time the reliability of operation is not diminished.

In order to compensate for elongation or contraction of the spring due to fluctuations in the climatic conditions a temperature regulator in the form of a thermostat may be interposed in the supply vessel suspending or supporting means.

Fig. 2 shows a supply vessel 5 according to the invention connected to a liquid filled gas meter 25. The gas meter is of known construction and consists essentially of a drum 26 rotatably mounted on a stationary axle 33 within a container 27 and divided by the partitions 28 into four compartments 29 disposed one behind the other. Each of the compartments is provided with an inlet 30 and an outlet 31. The axle 33 of the drum is hollow and connected to the gas feed pipe 34. The hollow axle communicates through a short length of pipe successively with the compartments 29 as they pass by on rotation of the drum. The container and drum are filled with liquid up to above the level of their horizontal mid plane, and this level must remain constant if the amount of gas passing through the compartments of the drum is to be accurately measured. The gas enters one of the compartments 29 thereby setting the drum in rotation, and as soon as the outlet of the compartment has risen above the liquid level the gas contained in this compartment is allowed to escape through a discharge pipe 35.

The supply vessel 5 rests on two compression springs 36 dimensioned according to the same principle as the spring 11 in the form of construction shown in Fig. 1, so as to keep the level of the liquid therein constant. The supply vessel 5 and the container 27 of the gas meter 25 intercommunicate by means of a flexible tube 16.

As already stated, the accuracy of the gas meter is dependent on the maintainance of a constant liquid level in the container 27, and losses of liquid due to evaporation must be compensated in ordinary gas meters of this type by re-filling the container from time to time. This is not necessary when the gas meter is connected to the supply vessel 5 according to the invention, since then the liquid level is automatically kept absolutely constant.

Fig. 3 shows a supply vessel 5 for supplying paint or ink to a suitable small vessel 40 in which the liquid is consumed for instance in such a manner that a painter's brush or a pen is dipped into the vessel. If the level of the paint or ink is kept constant and a brush or pen is dipped down to the bottom of the vessel 40 (see dotted lines in Fig. 3) the amount of liquid taken up by the brush or pen will remain the same every time the brush or pen is dipped into the vessel 40. In order to keep the level of the paint or ink constant, the vessel 40 is connected through the flexible tube 16 to the supply vessel 5 arranged according to the invention. The vessel is not suspended or supported on springs as shown in Figs. 1 and 2 but floats in a liquid-filled container 41. The buoyancy depending on the weight of the liquid displaced by the vessel 5 and thus indirectly on the amount of paint or ink in the supply vessel is so adjusted that the vessel 5 is raised when the amount of paint or ink decreases and is lowered when it is increased, to such an extent that the absolute level of paint or ink remains constant irrespective of the amount thereof. The vessel 40 for paint may be made very small since the paint consumed is continuously replaced by fresh paint from the supply vessel, therefore losses of paint by evaporation in the open vessel 40 are very small.

In Fig. 4 a receptacle 42 for use in connection with a reciprocable dipping frame 43 for the production of dipped goods such as fingerstalls and other hollow rubber articles is connected through the hose 16 to the supply vessel 5 which is supported by pistons 44 resting on compressed gas in cylinders 45, which gas acts analogously to the springs shown in Fig. 2, and thus alters the vertical position of the vessel 5 to keep the liquid at the required absolute level. The liquid consumed by the dipping operation will be replaced through the hose 16 by liquid from the vessel 5 which is raised or lowered to the same extent as the level of the liquid in the vessel 5 decreases or increases. In this manner the height of the liquid level in the receptacle 42, or the depth to which the reciprocating frame is immersed at each dipping operation, as indicated in dotted lines in Fig. 4, remains constant.

According to the provisions of the patent statutes, I have explained the principle and construction of my invention and have illustrated and described what I now consider to represent its best embodiment. However, I desire to have it understood that, within the scope of the appended claim, the invention may be practised otherwise than as specifically illustrated and described.

I claim:

Apparatus for maintaining a constant level of a supply of liquid which is to be utilized, said apparatus comprising a vertically movable vessel for containing the supply of the liquid which is to be utilized, flexible conduit means connected with said vessel for conducting liquid therefrom for utilization, means for supporting said vessel and for altering the vertical position of the same to maintain the level of the supply liquid therein at about a constant absolute vertical height regardless of the amount of supply liquid contained in the said vessel, and means within the said vessel for preventing oscillations of the supply liquid within the said vessel from being transmitted through the said flexible conduit means.

VICTOR TEODOR JULIN.